(12) United States Patent
Ruetschi

(10) Patent No.: US 7,218,935 B2
(45) Date of Patent: May 15, 2007

(54) CALLS SPANNING SUB-DOMAINS WITH INDEPENDENT CALL LINKAGE

(75) Inventor: Johannes Ruetschi, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 711 days.

(21) Appl. No.: 10/723,239

(22) Filed: Nov. 26, 2003

(65) Prior Publication Data

US 2005/0113097 A1    May 26, 2005

(51) Int. Cl.
*H04Q 7/20* (2006.01)
*H04Q 7/38* (2006.01)

(52) U.S. Cl. ............ 455/445; 455/422.1; 455/426.1; 455/426.2; 455/453; 455/448; 455/403; 455/500; 370/328; 370/352

(58) Field of Classification Search ........... 455/445, 455/422.1, 448, 426.1, 426.2, 466, 453, 414.1, 455/414.2, 417, 461, 500, 517, 550.1, 554.1, 455/555, 403; 370/328, 352
See application file for complete search history.

(56) References Cited

U.S. PATENT DOCUMENTS

| 6,157,832 | A  | * | 12/2000 | Lahtinen ............ 455/433 |
| 6,215,790 | B1 | * | 4/2001  | Voit et al. ............ 370/401 |
| 2002/0031131 | A1 | * | 3/2002 | Yemini et al. ........ 370/401 |
| 2005/0009525 | A1 | * | 1/2005 | Evslin ............... 455/445 |

* cited by examiner

*Primary Examiner*—Keith Ferguson

(57) ABSTRACT

A communications network, method and computer program product for managing network calls. Calls between mobile stations at base transceiver stations (BTS), each connected to a different base station controller (BSC) in a different switching sub-domain are passed between BSCs over a dedicated line between endpoints. Call linkage for the calls pass in call context objects separate from the calls and need not pass in a signaling channel with the calls.

40 Claims, 3 Drawing Sheets

CALLS SPANNING SUB-DOMAINS WITH INDEPENDENT CALL LINKAGE

BACKGROUND OF THE INVENTION

1. Field of the Invention

The present invention is related to computer telephony communications and more particularly, to providing call completion services between communications devices at different computer telephony interface (CTI) platforms.

2. Background Description

A typical computer telephony interface (CTI) integrates telephony communications with computer data communications, e.g., connecting a public switched telephone network (PSTN) to a local area network (LAN) and/or the Internet. The telecommunications connection point is typically referred to as an endpoint and that endpoint is in what is known as a switched sub-domain in the particular communications network. Normally, the endpoints are monitored by a software application such as what are known as computer supported telecommunications applications (CSTA) that provide application service interfaces for switching, computing and special resource functions. Calls made between endpoints can traverse multiple communications infrastructures, e.g., a session initiation protocol (SIP) in an Internet protocol (IP) based network, a switched circuit network (SCN) or an enterprise private network, such as a private branch exchange (PBX) based network.

As each call traverses between infrastructure endpoints, each CTI may assign a different, unique call identification (ID) attribute to it that the switching function uses to represent a valid call. In CSTA a call ID has the form of: callID (M) Octet String. The maximum length supported by the switching function is provided via the capabilities exchange services. These IDs are created by the switching function and are globally unique among all calls within the switching sub-domain. For example, a call may originate with a 10 digit telephone number (800-555-5421), a CTI to an IP network may assign one CSTA attribute (e.g., mobile@ 10.23.23.244) to identify the call as it traverses the IP network and another CTI may assign another, unique 3 digit ID (e.g., 987) as it exits the IP network at a second endpoint.

So, normally, the CSTA at each endpoint assigns the call linkage attributes to calls traversing between endpoints. Then, the CSTAs tunnel CSTA attributes (call linkage) thru a signaling channel with the call to identify and maintain the identity of events with the call. These attributes correlate events from the monitored endpoints. However, many infrastructure protocols may not support tunneling the call linkage attributes. So, unfortunately, these types of infrastructures have previously been unavailable for use in a CTI platform.

Thus, there is a need for maintaining the identity of events with respective calls in communications infrastructures that do not support call linkage attribute tunneling.

SUMMARY OF THE INVENTION

It is a purpose of the invention to provide a global view of a call to an application that monitors/controls devices in multiple CTI(/CSTA) sub-domains;

It is another purpose of the invention to enable endpoints to tunnel calls between each other even when a signaling channel is unavailable for passing call linkage with the calls.

The present invention relates to a communications network, method and computer program product for managing network calls. Calls placed between different switching sub-domains are passed over a dedicated line between endpoints. Call linkage for the calls pass in call context objects separate from the calls and need not pass in a signaling channel with the calls.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
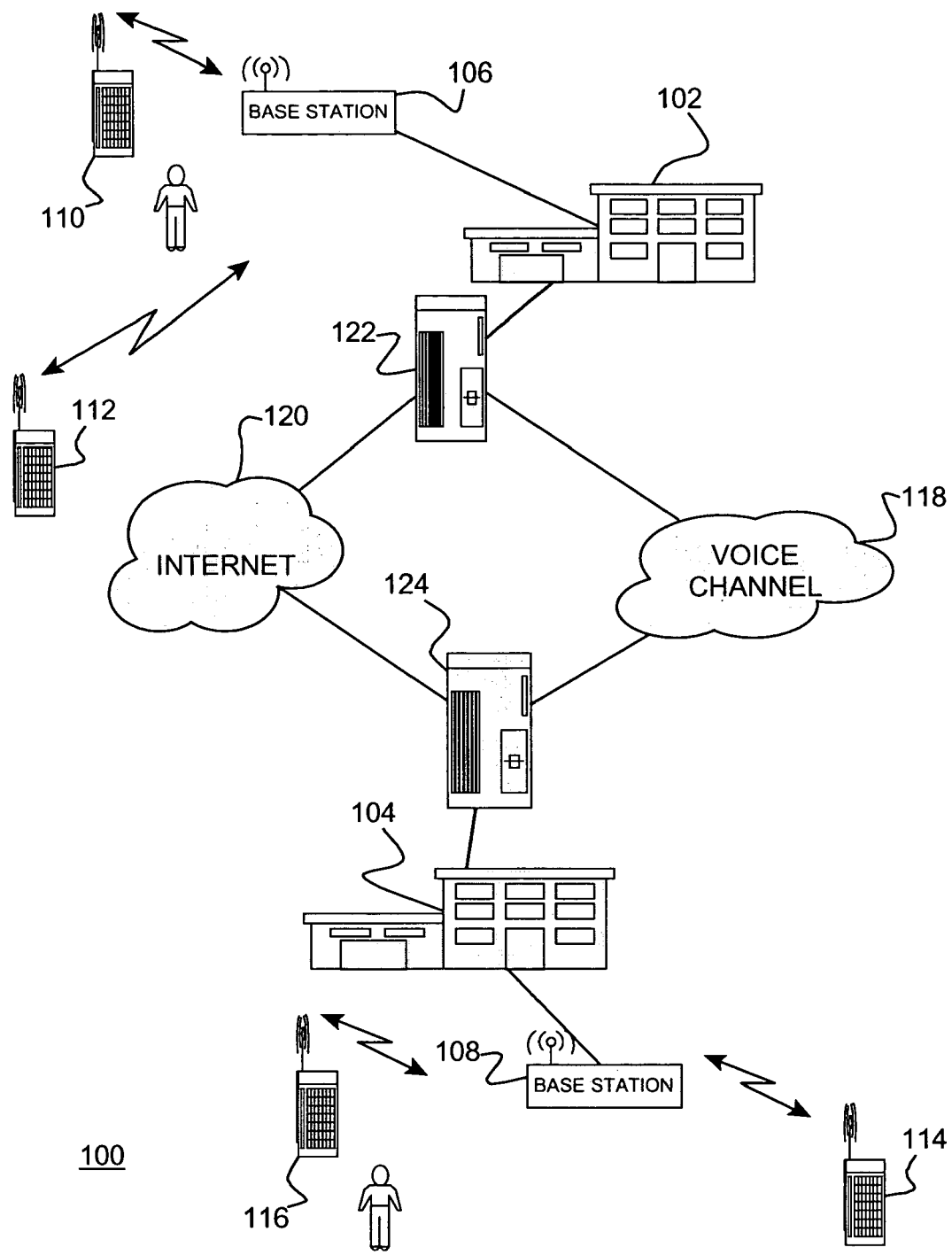
FIG. 1 shows an example of a preferred embodiment communications network, wherein calls tunnel between endpoints regardless of infrastructure protocol.

Turning now to the drawings and more particularly, FIG. 1 shows an example of a preferred embodiment communications network or Public Land Mobile Network (PLMN) 100, wherein calls tunnel between endpoints regardless of infrastructure protocol. In particular, calls may tunnel between base station controllers (BSCs) 102, 104, each of which includes one or more cells serviced by a local base transceiver station (BTS) 106, 108. Each BSC 102, 104 may be a different switching sub-domain (e.g., a different service area) within the network 100. Mobile Subscriber (MS) units or wireless communications devices 110, 112, 114, 116 in the cells wirelessly communicate through the particular local base station 106, 108. Each MS 110, 112 114, 116 may be any appropriate wireless communications device such as a second generation (2G) or third generation (3G) wireless communications device, e.g., a typical cellular phone. Further, each switching sub-domain is connected to a number of communications network infrastructures 118, 120 through an endpoint, e.g., a gateway server 122, 124. In particular, the communications network infrastructures 118, 120 may or may not allow passing call linkage information in a signaling channel. Examples of suitable such communications network infrastructures include, for example, a session initiation protocol (SIP) in an Internet protocol (IP) based network 120, a switched circuit network (SCN) 118 or an enterprise private network, such as a private branch exchange (PBX) based network.

So, for example, the communications networks 118, 120 may include: a standard integrated services digital network (ISDN) with common channel signaling (CCS) wherein signaling for all of the other channels of the link is carried on one dedicated (common) channel; and/or a channel-associated signaling (CAS) wherein each channel contains its own signaling. Each gateway server 122, 124 is an endpoint running computer supported telecommunications applications (CSTA) and, thereby, providing application service interfaces for switching, computing and special resource functions. Preferably, CSTA in endpoints 122, 124 include a call linkage facility (e.g., implemented in the gateway server) as CSTA middleware and that is provided, for example, in a software development kit (SDK). Thus, each endpoint 122, 124 provides CSTA call linkage, e.g., over the Internet 120, for calls spanning such multiple infrastructures 118, 120 (spanning calls) tunneling between endpoints 122, 124 and, further, without requiring specific signaling channels for passing any particular spanning call information, regardless of whether any such signaling channels available.

Spanning calls are passed between endpoints 122, 124 using an address or number from a pool of addresses or numbers (such as dial in direct (DID) numbers) allocated in each endpoint 122, 124. Calls between stations at different endpoints 122, 124 and traversing infrastructures 118, 120 are established by first placing the call to a designated number from the pool of numbers. Then, the local routing devices (e.g., a gateway server in a receiving endpoint 122, 124) pass call linkage independently and redirect the call to the called destination. So, call linkage is established and passed between endpoints 122, 124 independent of the call, uniquely correlating calls between endpoints. Advantageously, unlike prior art communications networks, even when a signaling channel is unavailable for call linkage, calls are pass between endpoints 122, 124 as if one were available.

Figure 2:
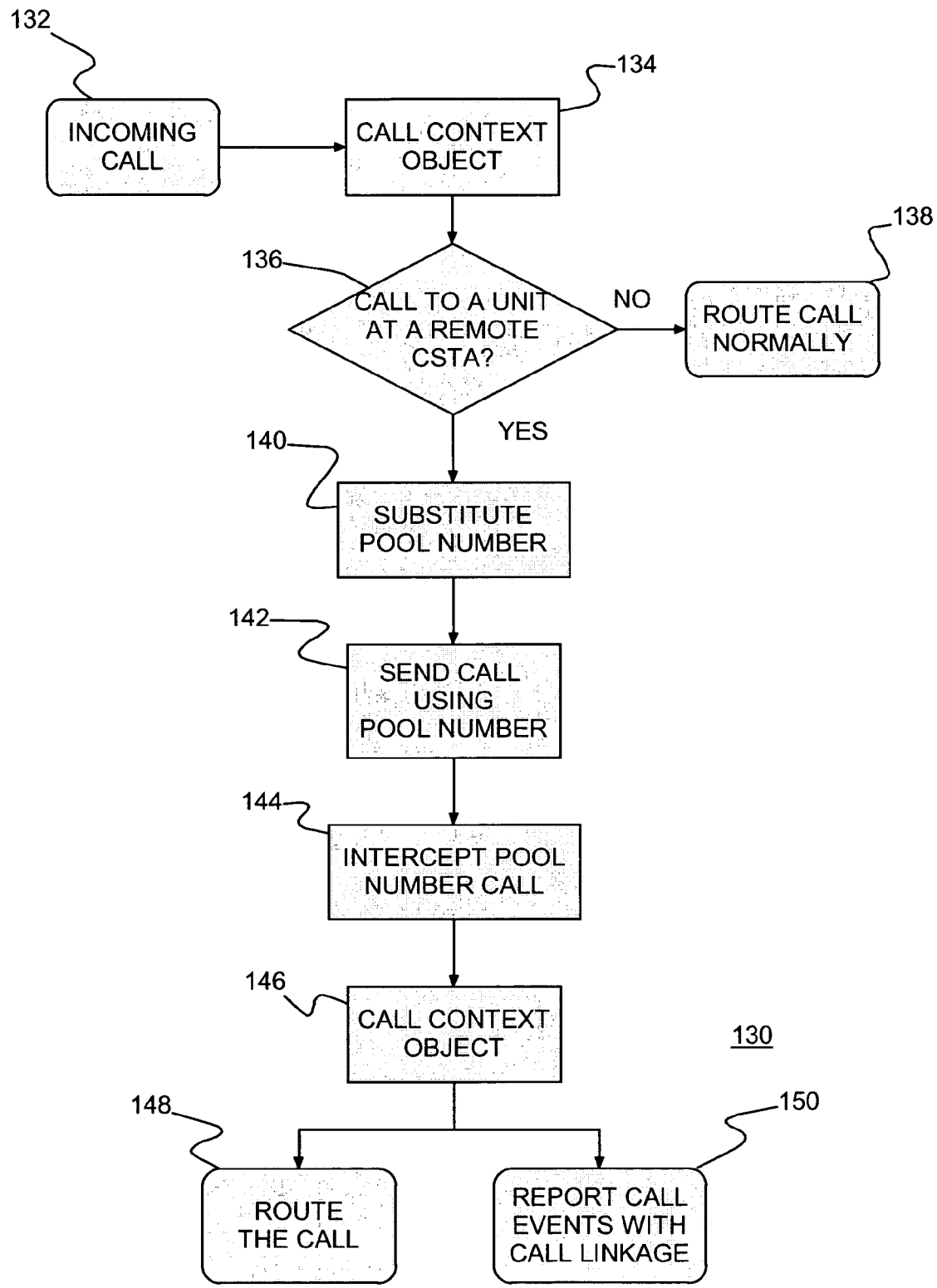
FIG. 2 shows an example of steps for call establishment of an incoming call between endpoints connected by communications infrastructures.

FIG. 2 shows steps for call establishment 130 with reference to the PLMN 100 of FIG. 1 for an incoming call 132 between endpoints (e.g., 122, 124) connected by communications infrastructures (e.g., 118, 120) according to a preferred embodiment of the present invention. In step 134 a call context object is created for the new call and a globally unique call linkage value is assigned to that call. If in step 136 the call is to remain in the originating sub-domain (e.g., directed from MS 110 to MS 112), then the call is routed normally in step 138. However, if in step 136 the CSTA in the originating endpoint 122 recognizes that the call is intended to reach a destination in a MS in a different CSTA sub-domain, e.g., MS 114; then, continuing to step 140 the CSTA in the originating endpoint 122 substitutes one of the circular pool numbers for the MS destination number. Next, the CSTA in the originating endpoint 122 caches the call ID, the pool number, and the original destination number in the call context object created in step 134; and, forwards the call context object to the destination switching sub-domain through connecting communications infrastructures, e.g., over the Internet 120. Substantially coincidentally, in step 142 the CSTA in the originating endpoint 122 sends the call on the pool number. In step 144 the call arrives on one of the pooled lines at receiving end and the local routing device (e.g., the gateway server or endpoint 124) receives the call context object and identifies the incoming pool number call as being from another sub-domain. In response in step 146, the CSTA in the receiving endpoint 124 retrieves original destination information from the call context object. Then, in step 148, the CSTA in the receiving endpoint 124 deflects the call to its original destination, MS 114; and, coincidentally in step 150, call events for the original destination are linked to the call context object and reported with the call linkage ID.

Figure 3:
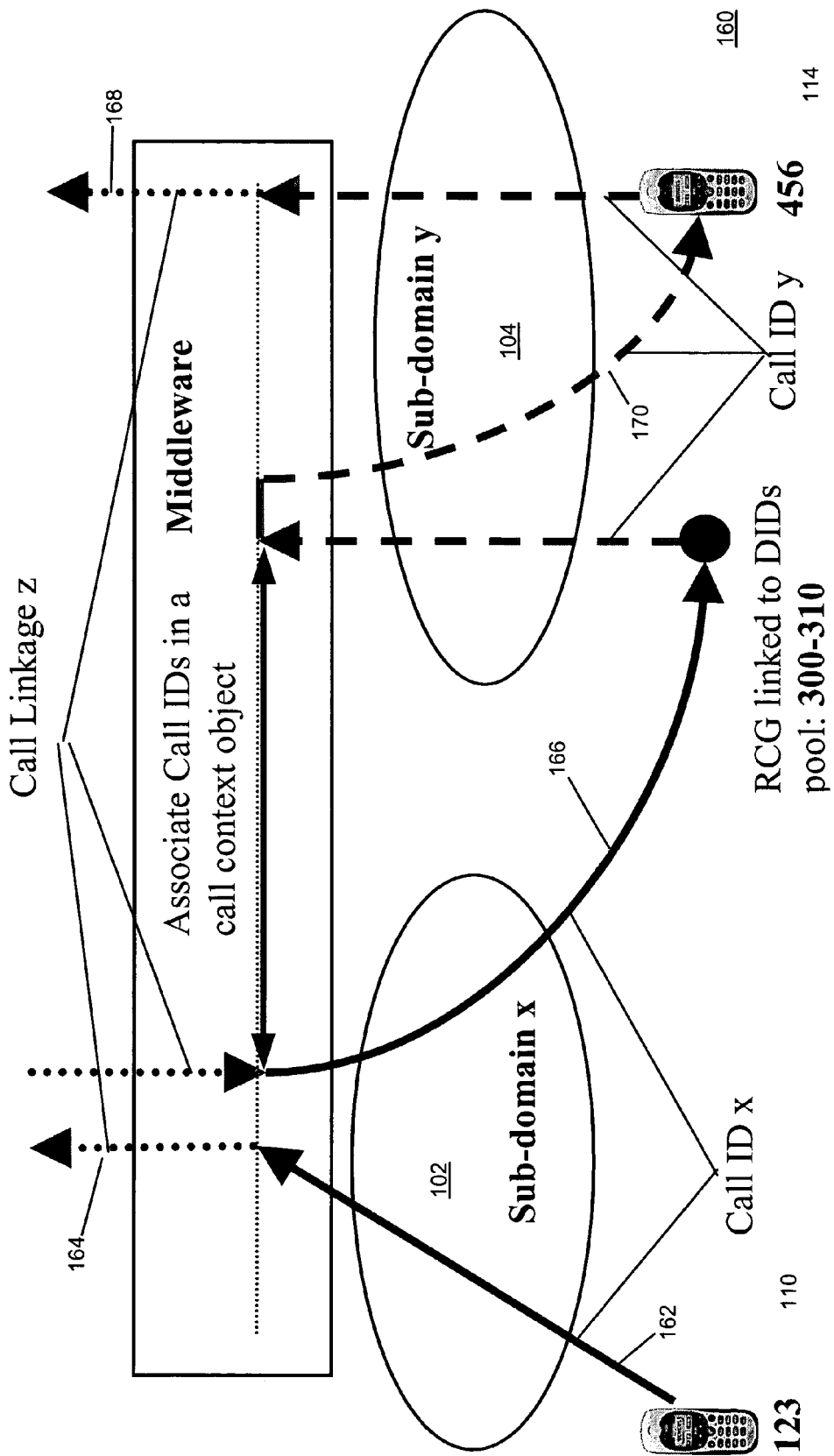
FIG. 3 shows an example of a call placed between mobile stations in different switching sub domains over communications infrastructures.

FIG. 3 shows an example 160 of a spanning call placed between mobile stations 110 and 114 in different sub domains 102 and 104, respectively, over communications infrastructures with reference to the call establishment example 130 of FIG. 2. So, an incoming spanning call 162 originates in MS 110 at 123 in sub-domain 102 directed to 456, which is not associated with a MS in sub-domain 102. The local CSTA (e.g., operating in 122 in FIG. 1) in sub-domain 102 creates a call context object 164 in step 134 for the new call and assigns a globally unique call linkage value (e.g., in ECMA, a globally UniqueCallLinkageID Octet String that specifies the globally unique call linkage identifier, no more than 16 octets) to that spanning call. Since the spanning call is directed to a destination in a different sub-domain, MS 116 identified by 456 in sub-domain 104, then, in step 140 one of the circular pool numbers (e.g., 300) is substituted for the destination number. In this example, the circular pool includes eleven numbers (300–310) that are assigned on a rotating basis. Next, the originating CSTA in sub-domain 102 caches the call ID, the pool number, and the original destination number in the call context object 164. Then, the originating CSTA in sub-domain 102 sends the call 166 to the pool number (300) and forwards the cached call context object 164 in step 142. The local CSTA (e.g., 124 in FIG. 1) at the receiving end 104 identifies the spanning call 166 in step 144 from the incoming call number and the call context object 164 as being associated with the pool number and so, from another sub-domain, 102 in this example. The receiving end CSTA in sub-domain 104 responds in step 146 by caching the call ID in a call context 168. Then, the receiving end CSTA in sub-domain 104 deflects the call 170 in step 148 to its intended destination, MS 114 in this example and, coincidentally, reports events for the original destination with the call linkage value (i.e., the call context object created in step 134) in step 150.

Advantageously, since the local CSTAs at each endpoint maintain call linkage outside and independent of the call, calls can be tunneled between endpoints regardless of whether a signaling channel is available in the connecting infrastructure.

While the invention has been described in terms of preferred embodiments, those skilled in the art will recognize that the invention can be practiced with modification within the spirit and scope of the appended claims.

What is claimed is:

1. A communications network comprising:
    a base transceiver station (BTS) in each cell of a plurality of wireless cells, wireless communications devices in said each cell wirelessly communicating with a corresponding said BTS;
    a plurality of base station controllers in communication with one another and managing spanning calls, said each BTS being connected to one base station controller (BSC), each said BTS connected to said one BSC being a local BTS in a local cell and each said BTS connected to another said one BSC being a remote BTS in a remote cell, said spanning calls being between said wireless communications devices in one said local cell and one said remote cell; and
    a gateway server in each of at least two BSCs, each said gateway server providing call linkage for managed said spanning calls in call context objects separate from said managed spanning calls.

2. A communications network as in claim 1, each of said wireless communications devices being a mobile station (MS), said gateway server further comprising:
    an application service interface creating said call context objects and forwarding created said call context objects to a remote said gateway server, said remote gateway server being in a remote cell.

3. A communications network as in claim 2, wherein said application service interface includes computer supported telecommunications applications (CSTA), said CSTA monitoring said BSC for spanning calls, creating said call context objects for identified incoming said spanning calls and forwarding said created call context objects to said remote gateway server.

4. A communications network as in claim 3, wherein said CSTA further receives forwarded said created call context objects, creates said call context objects for received said spanning calls and returns said created call context objects for said received spanning calls, said call linkage being established for said spanning call.

5. A communications network as in claim 1, wherein said gateway server routes spanning calls originating in said local cell to one of a number of dedicated lines.

6. A communications network as in claim 5, wherein said gateway server routes spanning calls from said dedicated lines to a called one of said wireless communications devices.

7. A communications network as in claim 6, wherein said dedicated lines are dial in direct (DID) numbers on a private branch exchange (PBX).

8. A method of managing calls between endpoints in a communications network, said method comprising the steps of:
   a) identifying spanning calls from incoming calls, a spanning call being a call to a remote mobile station (MS) at another endpoint;
   b) diverting said spanning calls to a dedicated line and forwarding call context objects to a receiving endpoint, said call context objects providing call linkage for corresponding said spanning calls;
   c) matching said call context objects with said corresponding spanning calls on said dedicated line at said receiving endpoint; and
   d) deflecting matched said spanning calls to called said mobile stations.

9. A method as in claim 8, wherein the step (a) of identifying spanning calls comprises:
   a1) creating a call context object with a globally unique call linkage value for incoming calls from local mobile stations; and
   a2) identifying any incoming calls directed to a MS at said other endpoint, said MS being a remote MS.

10. A method as in claim 9, wherein the step (a2) comprises identifying that said remote endpoint is in a different computer supported telecommunications applications (CSTA) sub-domain than said incoming calls.

11. A method as in claim 8, wherein said dedicated line is one of a plurality of pooled dedicated lines.

12. A method as in claim 11, wherein said plurality of dedicated lines is a pool of dial in direct (DID) lines in a private branch exchange (PBX).

13. A method as in claim 12, wherein said pool of DID lines is a circular pool.

14. A method as in claim 11, wherein forwarded said call context objects include a pool number identifying each corresponding spanning call with one of said pooled dedicated lines.

15. A method as in claim 11, wherein spanning calls are matched in the matching step (c) at said receiving endpoint by a corresponding one of said pooled dedicated lines.

16. A method as in claim 11, wherein said forwarded call context objects further include a called MS designation.

17. A method as in claim 8, before the step (d) of deflecting spanning calls further comprising:
   d1) creating another call context object indicating a receiving end identification; and
   d2) retuning said other call context object to an originating endpoint.

18. A method as in claim 17, wherein the returned said other call context object includes a new call identification (ID) and said method further comprises:
   e) reporting call events with said new call ID.

19. A computer-readable medium having stored thereon a plurality of instructions for managing calls between endpoints in a communications network, the plurality of instructions including instructions which, when executed by a processor in said endpoint, cause the processor to:
   a) identify spanning calls from incoming calls, a spanning call being a call to a remote mobile station (MS) at another endpoint;
   b) divert said spanning calls to a dedicated line and forwarding call context objects to a receiving endpoint, said call context objects providing call linkage for corresponding said spanning calls;
   c) match forwarded said call context objects with said corresponding spanning calls on said dedicated line; and
   d) deflect matched said spanning calls to called said mobile stations.

20. A computer readable medium as in claim 19 before the instruction step (a) of identifying spanning calls, causing the processor to:
   a1) create a call context object with a globally unique call linkage value for incoming calls from local mobile stations;
   a2) identify any incoming calls directed to a MS at said other endpoint, said MS being a remote MS.

21. A computer readable medium as in claim 20, wherein said remote endpoint is in a different computer supported telecommunications applications (CSTA) sub-domain than said incoming calls.

22. A computer readable medium as in claim 19, wherein, the plurality of instructions include instructions which cause the processor to set aside a pool of dedicated lines and said dedicated line is one of said pooled dedicated lines.

23. A computer readable medium as in claim 22, wherein said pool of dedicated lines is a pool of dial in direct (DID) lines in a private branch exchange (PBX).

24. A computer readable medium as in claim 23, wherein said pool of DID lines is a circular pool.

25. A computer readable medium as in claim 22, wherein forwarded said call context objects include a pool number identifying each corresponding spanning call with one of said pooled dedicated lines.

26. A computer readable medium as in claim 22, wherein spanning calls are matched in the matching step (c) by corresponding an incoming one of said pooled dedicated lines with a forwarded call context object value.

27. A computer readable medium as in claim 22, wherein said forwarded call context objects further include a called MS designation.

28. A computer readable medium as in claim 19, before the step (d) of deflecting spanning calls further comprising:
   d1) creating a receiving end call context object indicating a receiving end identification; and
   d2) retuning said receiving end call context object to an originating endpoint.

29. A computer readable medium as in claim 28, wherein the returned said receiving end call context object includes a new call identification (ID) and call events are reported with said new call ID.

30. A computer readable medium as in claim 19, wherein the plurality of instructions are computer supported telecommunications applications (CSTA) middleware in a software development kit (SDK).

31. A computer program product for managing calls between endpoints in a communications network, said computer program product comprising a computer usable medium having computer readable program code thereon, said computer readable program code comprising:

computer program code means for identifying spanning calls from incoming calls, spanning calls including calls to and forwarded from other endpoints;

computer program code means for creating call context objects;

computer program code means for diverting said spanning calls to a dedicated line and forwarding said call context objects to another endpoint, forwarded said call context objects providing call linkage for corresponding said spanning calls;

computer program code means for matching said forwarded call context objects with corresponding said spanning calls; and computer program code means for deflecting matched said spanning calls to called mobile stations.

32. A computer program product as in claim 31, the computer program code means for creating call context objects assign a globally unique call linkage value for incoming calls from local mobile stations.

33. A computer program product as in claim 32, further comprising computer program code means for setting aside a pool of dedicated lines and said dedicated line is one of said pooled dedicated lines.

34. A computer program product as in claim 33, wherein said pool of dedicated lines is a pool of dial in direct (DID) lines in a private branch exchange (PBX).

35. A computer program product as in claim 33, wherein forwarded said call context objects include a pool number identifying each corresponding spanning call with one of said pooled dedicated lines.

36. A computer program product as in claim 35, wherein the computer program code means for matching corresponds incoming said pooled dedicated lines with forwarded call context object values.

37. A computer program product as in claim 31, wherein said call context objects further include a called MS designation.

38. A computer program product as in claim 31, wherein the computer program code means for creating call context objects creates a receiving end call context object indicating a receiving end identification and, computer program code selection means for deflecting spanning calls returns said receiving end call context object to an originating endpoint.

39. A computer program product as in claim 38, wherein the receiving end call context object includes a new call identification (ID) and said computer readable program code further comprises:

computer program code selection means for reporting call events with said new call ID.

40. A computer program product as in claim 31, wherein computer program product is a software development kit (SDK) for providing computer supported telecommunications applications (CSTA) middleware.

* * * * *